United States Patent

[11] 3,603,555

| [72] | Inventor | Thomas E. Lohr<br>Warren, Mich. |
|---|---|---|
| [21] | Appl. No. | 809,122 |
| [22] | Filed | Mar. 21, 1969 |
| [45] | Patented | Sept. 7, 1971 |
| [73] | Assignee | Allied Chemical Corporation<br>New York, N.Y. |

[54] OUTSIDE REARVIEW MIRROR ASSEMBLY
8 Claims, 6 Drawing Figs.

| [52] | U.S. Cl. | 248/481 |
|---|---|---|
| [51] | Int. Cl. | B60r 1/00 |
| [50] | Field of Search | 248/481, 484, 483, 475, 488, 482 |

[56] References Cited
UNITED STATES PATENTS

| 2,089,463 | 8/1937 | Ritz-Woller | 248/481 |
|---|---|---|---|
| 2,150,173 | 3/1939 | Hobny | 248/481 |
| 2,821,115 | 1/1958 | Weinrich et al. | 248/484 |
| 2,862,419 | 12/1958 | Pryon | 248/481 |
| 2,921,807 | 1/1960 | McRae | 248/482 |
| 3,448,553 | 6/1969 | Herr et al. | 248/481 |

FOREIGN PATENTS

| 603,485 | 8/1960 | Canada | 248/483 |

Primary Examiner—Edward C. Allen
Attorneys—Marvin Bressler and Jonathan Plaut

ABSTRACT: A rearview mirror assembly for attachment to the outside of a vehicle, such as a motor car, at a convenient location for the driver to see and reach for manual adjustment, which is provided with a ball and socket swivel joint secured by a pretensioned adjustable spring retainer. The mirror is supported on a stem which extends into a mirror support column having a ball on the other end for swivel support within a ball socket formed in the base support bracket and the ball is retained in the ball socket by an adjustable pretensioned leaf spring, the construction being such that all members can be preassembled together in a convenient manner. The supporting portions of the mirror are made of plastic material of such strength, at least at the swivel joint, as to break or snap off under impact to provide a safety feature.

PATENTED SEP 7 1971 3,603,555
SHEET 1 OF 2
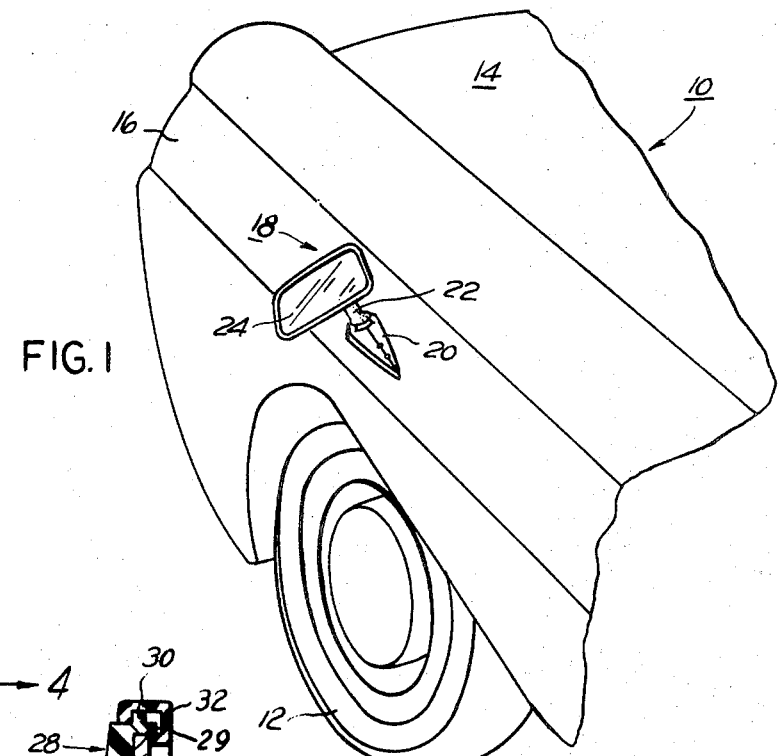
FIG. 1
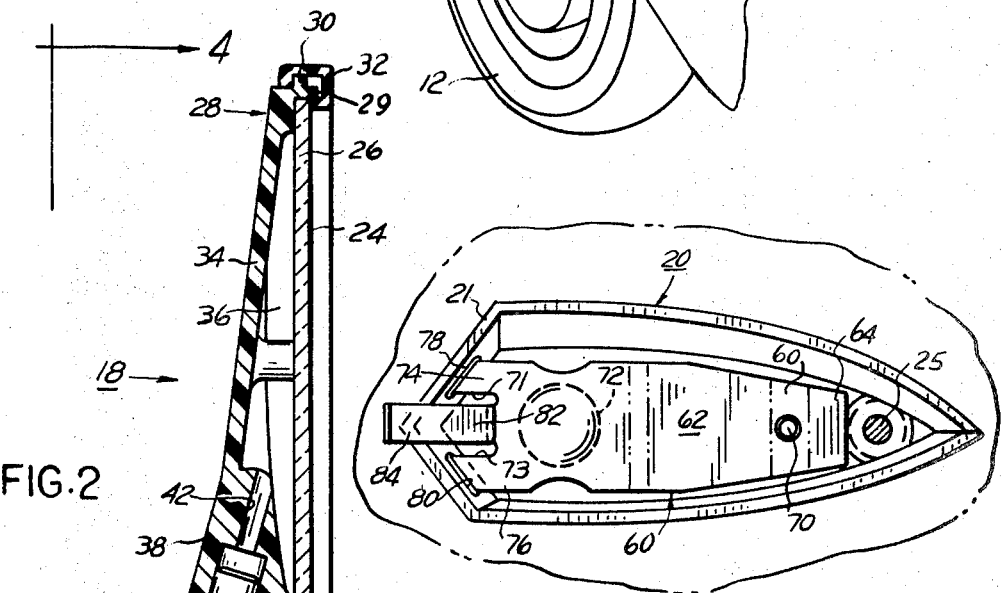
FIG. 2
FIG. 3
INVENTOR
THOMAS E. LOHR
BY Hume, Krass, Gifford, & Patalidis
ATTORNEYS

INVENTOR
THOMAS E. LOHR

BY Hauke, Krass, Gifford, & Patalidis
ATTORNEYS

OUTSIDE REARVIEW MIRROR ASSEMBLY

BACKGROUND OF THE INVENTION

1. Field of the Invention

The present invention relates to rearview mirror assemblies, and more in particular to rearview mirrors for vehicles which are usually mounted on a ball and socket joint for universal angular adjustment of the mirror.

2. Brief description of the Prior Art

Swivel-type universal mountings for mirrors, such as automobile rearview mirrors, are well known in the art. These mirrors are commonly supported on a ball and socket connection directly associated with the mirror casing. The casing is provided rearwardly with a bulge or boss portion which forms a spherical housing or socket to accommodate the ball which has an outwardly extending stem or shank which is secured to the mirror bracket. Usually, resilient means are provided in the bulge or boss portion of the mirror casing adapted to press against the ball to frictionally retain the ball within the socket.

This known construction is adequate for inside rearview mirrors, however, the use of this construction on outside rearview mirrors is objectionable, primarily because of the opening in the mirror case at the ball and socket joint which permits water to enter the case causing the case and the ball point to corrode and thus making the ball joint inoperable. A more damaging effect caused by entrance of water into the mirror case is the impairment of the highly sensitive mirror backing which causes the reflective surface to become spotty and dull.

Additionally, this known construction is deficient in view of the difficulty of assembly and disassembly because of the particular construction which makes it impossible to replace only the mirror, when damaged, without having to replace the ball joint too.

Such a construction also has the disadvantage that when subjected to an external force, these types of mirrors tend to break at the ball joint and this leaves a protrusion which can be especially dangerous to pedestrians.

SUMMARY OF THE INVENTION

The rearview mirror of the present invention provides novel means to eliminate the disadvantages of known rearview mirrors having an external ball joint connection.

Generally, the present novel structure comprises a mirror retained in a casing which has a column extending in an oblique direction therefrom. The column is formed with an axial bore and the end of the column is shaped into a concave semispherical seat adapted to fit over a complementary convexly formed semispherical protrusion for universal pivotal engagement therewith and which extends from the surface of the mirror support base which is adapted to be fastened to an outside portion of the vehicle body at a convenient location. The semispherical protrusion of the mirror support base provides an internal spherical socket for a ball member which has a stem extending through an opening in the protrusion and into the axial bore of the mirror column. In any adjusted angular position of the mirror, the opening in the protrusion on the mirror support base is sealingly closed off preventing the entrance of water into the ball joint. The ball member, which is disposed within the mirror support base, is resiliently retained in frictional pivotal contact within the spherical socket by means of an adjustable spring, the tension of which can be suitably adjusted from the inside or outside of the mirror support base.

The complete mirror assembly can be preassembled ready for attachment to the vehicle body. However, by virtue of its construction, the mirror alone can be conveniently replaced, if needed, by forcing the mirror support column off the stem of the ball member without disturbing the ball joint and mirror support base. The mirror glass is attached to the mirror casing by a snap-on member so as to permit a broken mirror glass to be easily replaced. Water or dirt is prevented from entering the ball joint and the generally deficient conventional structure, which has the ball joint in the mirror casing, is effectively avoided.

Further objects and novel features of the present invention will become apparent by the following detailed description with reference to the accompanying drawings.

BRIEF DESCRIPTION OF THE DRAWINGS

The drawings illustrate two preferred embodiments of the present invention, in which:

FIG. 1 is a fragmentary perspective illustration of the left front end of a motor vehicle showing the present novel rearview mirror in installed position on the vehicle;

FIG. 2 is an enlarged vertical cross section through the mirror assembly shown in FIG. 1;

FIG. 3 is a bottom view of the mirror support base of the mirror structure shown in FIG. 2;

DESCRIPTION OF THE PREFERRED EMBODIMENTS

Figure 4:
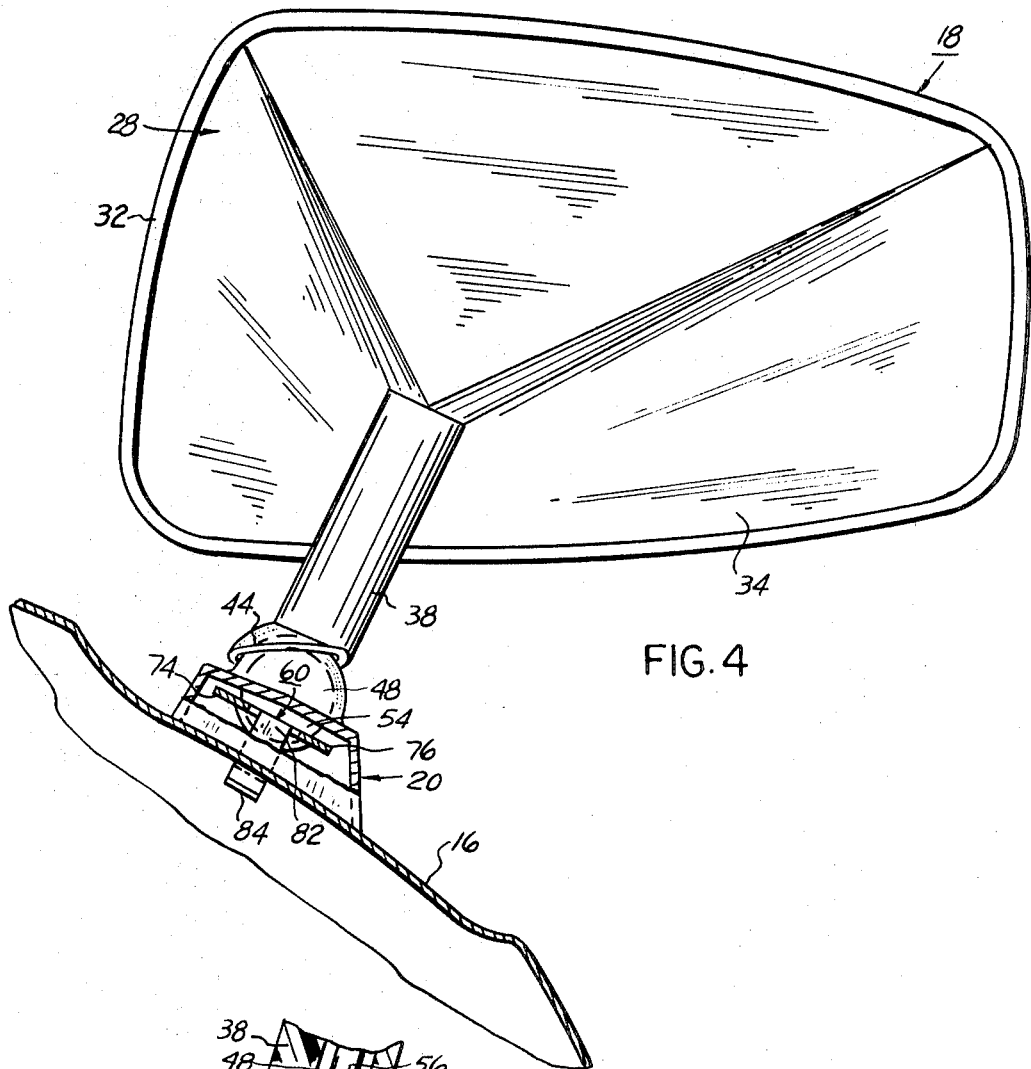
FIG. 4 is a rear view of the mirror assembly shown in FIGS. 1 and 2.

With reference to FIG. 1, there is illustrated a fragmentary portion of an automobile 10 showing a front wheel 12, a portion of the hood 14 and a front fender at 16.

A rearview mirror assembly 18 is shown mounted on the front fender 16 in a position such as to be easily viewable by the driver of the vehicle and includes a support base 20 of generally shell-like formation, which carries the column 22 of the mirror assembly 18, the latter of which has a reflecting surface shown at 24 normally facing the driver of the vehicle.

Referring now more particularly to FIGS. 2 to 4, it will be seen in FIG. 2 that the reflective surface 24 is provided on a mirror glass plate body 26, which has a suitable backing (not shown) and which is retained within a mirror case or housing 28 having a circumferentially outwardly extending lateral flange 29 and radial flange 30 and the glass plate body 26 is contained within the confines of the lateral flange portion 29. To retain the glass plate body 26 within the casing 28, a resilient snapring member 32 has been provided adapted to be snapped over both the radial flange 29 and lateral flange portion 30 to securely retain the glass plate body 26 in the mirror casing 28. The snapring 32 is preferably made of a plastic material and can be forcibly snapped off the flanges 29 and 30 to replace the glass body 26 if need be.

The mirror casing 28 comprises a rearwardly convex body 34 providing a cavity 36 between the back of the glass plate body 26 and the inner surface of the casing body 34. As particularly noted in FIG. 4, the casing body 34 culminates at a predetermined location into a column 22 extending therefrom at an oblique angle to the plane of the glass plate body 28. The casing column 22 is provided with an axial bore 40 which is in communication with the casing cavity 36.

The open end of the column 22 expands into a bell-shaped spherical mouth formation forming a socket 44 which is adapted to pivotally engage internally with a spherical external surface 46 of a spherical protrusion 48 extending from the top of the shell-like support base 20. The internal surface of the protrusion 48 forms a spherical socket 50 for a ball member 54. The ball member 54 is provided with a stem 56 which extends into the bore 40 of the mirror column 22 through a top opening 58 in the protrusion 48 to thus operably connect the mirror assembly 18 with the ball 54. Preferably the mirror casing 28 including the column 22 and the ball member 54 including the stem 56 are made of corrosion-resistant plastic material and in assembly the column 22 is press-fitted over the stem 56 to provide a shakeproof connection with the ball member 54.

It will be noted that in this construction a dual ball joint has been provided which is designated internally by the ball 54 and spherical socket 52 and externally by the spherical surface 56 and the spherical socket mouth 44 of the mirror column 22. The opening 58 in the protrusion 48 is considerably larger than the diameter of the ball stem 56 to permit angular displacement of the ball stem therein upon adjustment of the mirror. As seen in FIG. 2, the ball stem 52 is provided with a portion 55 of reduced diameter immediately adjacent the ball 54 which provides a safety feature so that under impact the mirror assembly 18 will snap off at the socket 44 breaking the relatively weak stem portion 55 at the ball 54 providing a clean break at the protrusion 48 having no sharp edges liable to cause injury as frequently encountered in conventional metal mirror constructions.

It will be further noted that by the extension of the socket 44 over and around the opening 58, the opening will be effectively sealed in any angular position of the mirror assembly preventing the entrance of water into the ball joint since any water will flow off from the external skirt of the outer socket 44.

With particular reference now to FIGS. 2 and 3, the ball member 54 is frictionally retained in the socket 50 by means of a spring member 60. The spring member 60, as most clearly seen in FIG. 3, is in the form of a leaf spring having a primary substantially flat body portion 62 culminating in an attachment end 64 having a recessed portion 66 which is provided with a threaded aperture 68 for threading engagement with a fastener 70, which is recessed in the top of the mirror support base 20 to thus secure the spring within the support base 20. Opposite the end 64, the body portion 62 is spherically recessed as at 72 to provide a seat for the support of the ball 54. As particularly seen in FIG. 3, adjacent the ball seat 72 and forwardly thereof the spring 60 is longitudinally slotted at two locations, as at 71 and 73, to provide parallel opposite tongues 74 and 76 formed as a continuation of the spring body 62. In assembly, the tongues 74 and 76 are adapted for insertion into appropriate apertures 78 and 80 in the downwardly extending front wall portion 21 of the support base 20 for retainment therein. The central portion of the forward end of the spring 60, between the slots 71 and 73, is of considerably greater length than the adjacent tongues 74 and 76 and extends out of the general plane of the body 62 of the spring angularly downwardly to provide an independent leg portion 82 adapted to be inserted through an appropriate aperture 17 in the car body panel 16. The end of the leg portion 82 is reversely bent out of the plane of the leg portion to provide a retaining finger 84 which, in assembly, is adapted to abut with resilient force against the inside of the body panel 16. Thus, the spring 60 is retained within the support bracket 20 at two longitudinally spaced points and is additionally retained on the body panel 16. By rotation of the fastener 70, the resilient force of the spring 60 acting on the ball 54 can be appropriately adjusted.

In assembly of the support base 20, the ball member 54 is first placed in the internal ball socket 50 of the protrusion 48 having the stem 56 extending through the aperture 58. The spring 60 is then placed in the support base 20 by extension of the tongues 74–76 through the apertures 78–80 in the front sidewall 21 of the support base having the ball seat 72 engage the ball 54. Upon alignment of the aperture 68, the fastener 70 is threaded therethrough to secure the spring in position inside the bracket 20 to thus retain the ball in the socket 50. The preassembled bracket support 20 is then ready for fastening to the panel 16 of the vehicle body by insertion of the leg portion 82 of the spring through the aperture 17 and appropriate displacement of the retaining finger 84 for engagement with the inner surface of the body panel 16 oppositely underneath the front wall portion 21 of the support bracket to thus simultaneously retain the front end of the support bracket on the panel 16. The rear end 23 of the support bracket is then fastened to the body panel 16 by means of a fastener 25. Thereafter, the tension of the spring 60 on the ball member 54 can be suitably adjusted by rotation of the fastener 70.

Figure 5:
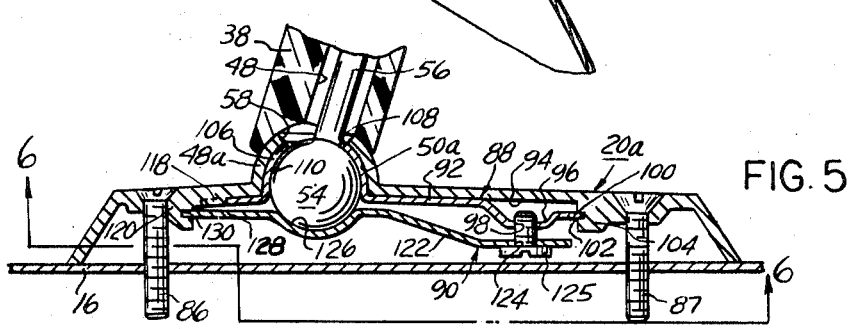
FIG. 5 is a cross section through a modified embodiment of a mirror support base which can be substituted for the base shown in FIG. 2.
Figure 6:
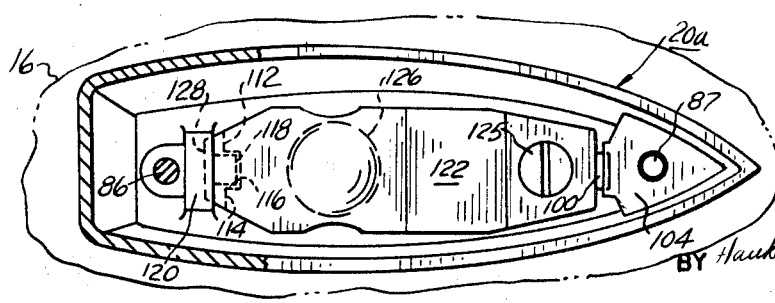
FIG. 6 is a bottom view of the modified support base shown in FIG. 5.

FIGS. 5 and 6 show a slightly modified mirror support bracket 20a for attachment at opposite ends by means of fasteners 86 and 87 to the body panel 16. In this embodiment, the ball member 54 is frictionally retained within the ball socket 50a of the spherical protrusion 48a by two oppositely disposed spring members 88 and 90, which substantially surround the ball 54 and are adapted to exert oppositely directed compression forces on the ball 54 to obtain sufficient friction to securely retain the ball and thus the mirror in the desired adjusted position.

The upper spring 88 comprises, in general, a substantially planar longitudinal body portion 92 adapted in assembly to abut against the inside 94 of the top of the support bracket 20a. Rearwardly, the upper spring is provided with a recessed portion 96 provided with a threaded aperture 98 for a purpose to appear. The rear end of the upper spring adjacent the recess 96 is provided with a tongue 100 which is adapted in assembly to be inserted within a planar slot 102 provided in an inwardly extending boss portion 104 of the support bracket 20a through which the rear fastener 87 extends. Intermediate its ends, the upper spring 88 is provided with a spherical protrusion 106 adapted to be fitted into the bracket protrusion 48a for matching engagement with the internal socket 50a. The upper portion of the spring protrusion 106 is provided with an aperture 108 aligned with and substantially of the same size as the aperture 58 in the bracket protrusion 48a for extension of the ball stem 56 therethrough. The internal surface of the spring protrusion 106 provides an upper ball socket 110 for receipt of the ball member 54 for swiveling engagement. Thus, in this embodiment, the ball is not supported directly in the socket 50a of the bracket protrusion 48a but instead in the spring socket 110 which is nonmovable within the socket 50a.

As seen in FIG. 6, to retain the upper spring 88 against displacement, the forward end of the upper spring 88 adjacent the protrusion 106 is provided with opposite planar tongue extensions 112 and 114, which define a central slot 116 in between them, which is adapted in assembly to be engaged by an internal ridge portion 118 extending from an internal boss formation 120 formed inside the bracket 20a through which the front fastener 86 extends.

The lower spring 90 comprises similarly a substantially planar longitudinal body portion 122 which, in plan view, may be shaped similarly to the upper spring 88. The rear end of the lower spring 90 is freely suspended within the support bracket 20a and is apertured at 124 to receive a screw 125 which in assembly is adapted to be threadedly engaged within the threaded aperture 98 in the recess 96 of the upper spring 88 to thus adjustably connect the lower spring to the upper spring. Intermediate the ends of the lower spring, a spherical recess 126 has been provided in the body portion 122 of the spring for the receipt and support of the lower portion of the ball 54 in opposite alignment with spherical protrusion 106 of the upper spring 88 to thus clamp the ball 54 in between them. The front end of the lower spring 90 is provided with a tongue portion 128 which in assembly extends into an appropriate slot 130 provided laterally within the internal boss formation 120 to thus retain the front end of the lower spring 90.

In assembly of this embodiment, the upper spring 88 is first placed within the support bracket 28 inserting the spring protrusion 106 within the bracket protrusion 48a and the rear end of the upper spring within the slot 102 of the boss portion 104. At the front end, the slot 116 then engages the ridge 118 to prevent the spring from planar displacement. Thereafter, the ball member 54 is placed in the bracket 20a with its stem 56 extending through the apertures 108 and 58 of the protrusions 106 and 48a respectively. The lower spring 90 is then assembled by placing the front end in the retaining slot 130 and engaging the ball 54 in the spherical recess 126. Upon alignment of the apertures 98 in the upper spring 88 and 124 in the lower spring 90, the screw 125 is threaded into both apertures causing the rear ends of the springs to be clamped together and thereby resiliently clamp the ball 54 between them. The ridge 118 engaged within the slot 116 of the upper spring prevents the upper spring from rotation upon actuation of the screw 125. Relative to the advancement of the screw 125, the tension of the springs 88 and 90 can be adjusted to provide the necessary friction force on the ball 54 to retain the ball and thus the mirror in any angular position.

Obviously, the adjusting or tensioning screw 125 may be inserted from the top of the support bracket 28 similar as in the embodiment of FIGS. 2 to 4 to permit adjustment of the tensioning force for the ball joint from outside the bracket or the car body.

Preferably, the plastic mirror casing 28 and snapring 32 are colored to match the color of the car body or of the vinyl top.

Thus, by means of the novel feature in the present invention, an improved outside mirror support has been provided which permits easy assembly and disassembly and replacement of the mirror without disturbance of the ball and socket joint and providing a desirable safety feature permitting the mirror to break off under impact flush with the car body so as not to leave any sharp dangerous edges at the break.

Additionally, an improved embodiment has been provided by placing the ball joint in the mirror support bracket instead of in the mirror casing as presently being practiced, and thereby providing a structure which efficiently prevents the entrance of water or dirt into the ball joint.

The present invention may be embodied in certain other forms without departing from the spirit and essential characteristics thereof, therefore, the present embodiments are considered in all respects to be illustrative only and not restrictive, the scope of the invention being indicated by the appended claims rather than by the foregoing description.

I claim:

1. A universally angularly adjustable mirror assembly comprising:
   a support base for attachment to a panel member, a portion of said base shaped into a spherical protrusion along its top face, said protrusion having an opening;
   a mirror retained within a casing, said casing culminating into an elongated hollow column;
   a spherically shaped formation disposed at the end of said column, said formation extending pivotally over said spherical protrusion to sealingly close said opening in any angularly adjusted position of said mirror;
   a ball member disposed within said spherical protrusion for universal engagement therewith;
   a stem integral with said ball member, said stem having a diameter substantially smaller then said opening extending into said column and secured thereto, said stem having a portion of reduced diameter adapted to snap off from said ball member upon impact;
   at least one leaf spring having a spherical seat portion to frictionally retain said ball member within said spherical protrusion; and
   means for adjustably securing said leaf spring within said support base.

2. The mirror assembly as defined in claim 1, in which said leaf spring comprises a longitudinal substantially planar body portion having opposite ends, one of said opposite ends being provided with tongues for extension through apertures provided in said support base to retain said one end, the other end having a threaded aperture and a fastener associated with said support base to adjustably secure said other end of said leaf spring to said support base.

3. The mirror assembly as defined in claim 1, in which said one end of said leaf spring is provided with a depending leg portion extending out of the plane of said spring for extension through an aperture in said panel member, said leg portion having a resilient finger at its end for clamping engagement with the underside of said panel member.

4. The mirror assembly as defined in claim 3, in which said pair of leaf springs comprises an upper spring and a lower spring, said upper spring having a spherical protrusion extending from the body of said spring for insertion within said spherical protrusion of said support base, said lower spring being provided with a spherical recess opposite said spherical protrusion for retainment of said ball member in said spherical protrusion of said upper spring and adjustable fastening means at one end of said upper and said lower spring to clamp said springs together.

5. The mirror assembly as defined in claim 1, in which said resilient means comprises a pair of oppositely disposed leaf springs adjustably retained within said support base and having means to pivotally frictionally engage said ball member.

6. The mirror assembly as defined in claim 5, in which said upper spring is provided at opposite ends with means comprising tongues adapted to engage complementary means in said support base for retainment therein, said lower spring having a free end secured by said fastener to said upper spring.

7. The mirror assembly as defined in claim 5, in which said spherical protrusion of said upper spring is provided with an opening registering with said mouth-shaped opening in said spherical protrusion of said support base to permit the extension of said stem of said ball member therethrough for angular pivotal displacement therein.

8. The mirror assembly as defined in claim 1, in which said casing including said column and said ball member including said stem are made of corrosion-resistant plastic material.